March 15, 1932. A. L. NELSON Re. 18,384

PISTON

Original Filed June 2, 1923 2 Sheets-Sheet 1

Inventor
Adolph L. Nelson

By E. E. Bradford

Attorney

March 15, 1932. A. L. NELSON Re. 18,384

PISTON

Original Filed June 2, 1923 2 Sheets-Sheet 2

Inventor
Adolph L. Nelson

By

Attorney

Reissued Mar. 15, 1932 Re. 18,384

UNITED STATES PATENT OFFICE

ADOLPH L. NELSON, OF DETROIT, MICHIGAN, ASSIGNOR TO BOHN ALUMINUM & BRASS CORPORATION, OF DETROIT, MICHIGAN

PISTON

Original No. 1,548,329, dated August 4, 1925, Serial No. 643,073, filed June 2, 1923. Application for reissue filed July 24, 1926. Serial No. 124,729.

My said invention relates to a piston for internal combustion engines and the like and it is an object of the invention to separate the skirt from the head so that the skirt may be largely insulated from the action of the heat on the head. In some instances also the skirt may be made of different material from the head, for example the head may be made of cast iron to minimize wear in the ring grooves while the skirt may be of a relatively light and soft alloy.

The main object of the invention is to provide a piston in which the skirt shall be relatively free from contraction and expansion being when cold in a condition of strain which is relieved when the skirt warms up but due to such strain there is very little actual increase in diameter during the warming process. The advantages of such a construction in preventing or decreasing the piston slap when the engine is cold and in insuring the maintenance of a film of oil between the piston and the cylinder at all times will be obvious to those skilled in the art.

Subsidiary purposes are to provide efficient means for holding together the separate head and skirt, to provide means insuring correct alinement of the head and the skirt, and to provide improved means for preventing access of oil to the cylinder above the piston. Other purposes will appear upon consideration of the subjoined description.

Figure 1:
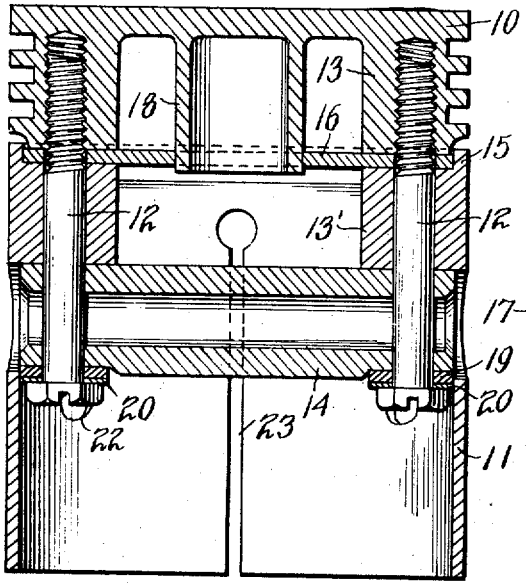
Figure 2:
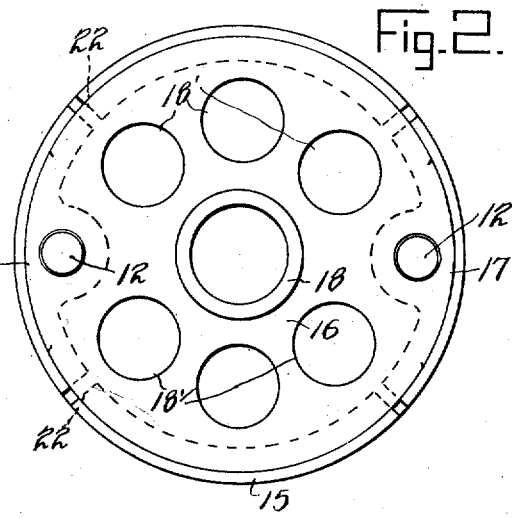
Figure 3:
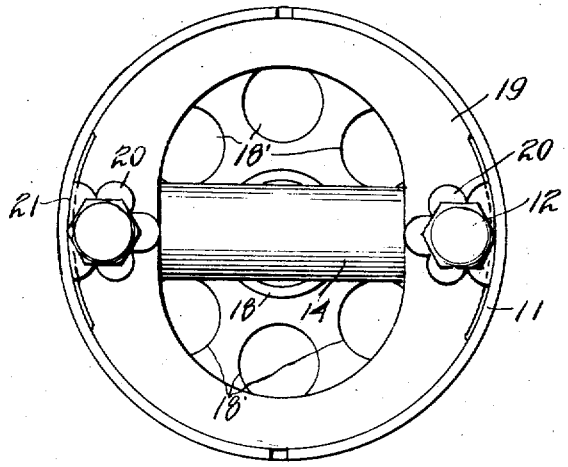
Figure 4:
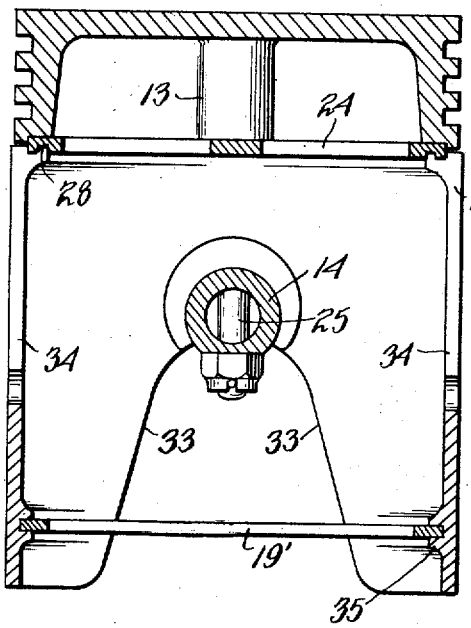
Figure 5:
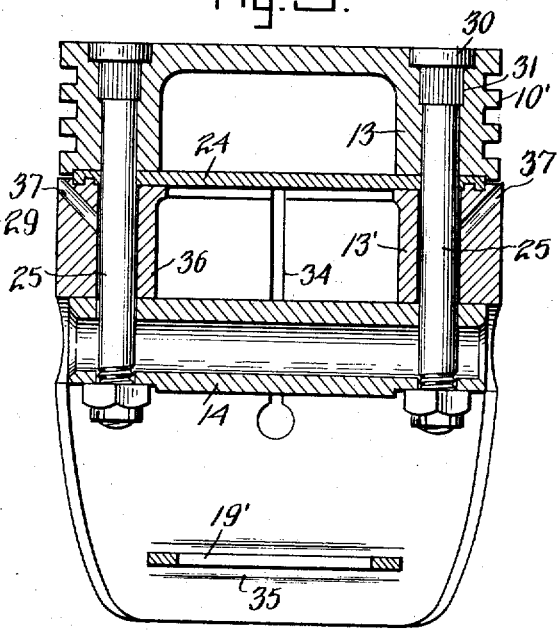
Figure 6:
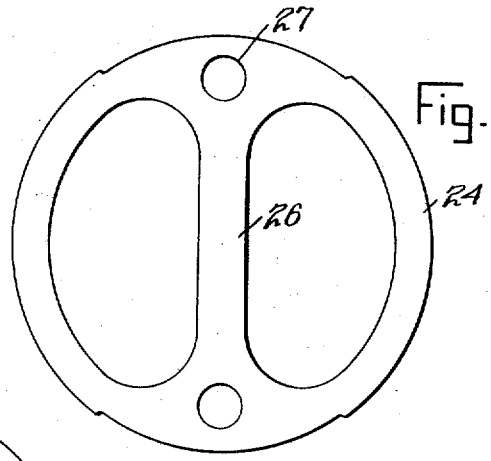
Figure 7:
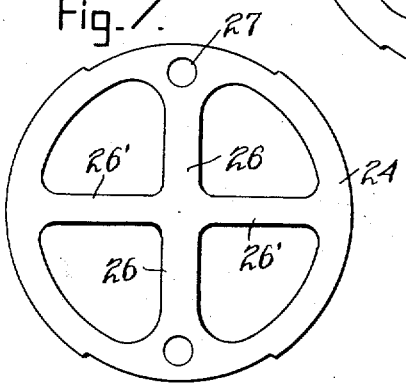

Referring to the accompanying drawings which are made a part hereof and on which similar reference characters indicate similar parts, Figure 1 is a central vertical section of one form of my invention, Figure 2, a horizontal section of Figure 1 immediately above the upper strut, Figure 3, an inverted plan of Figure 1, Figure 4, a vertical central section of another form of my invention, on line 4—4 of Figure 5, Figure 5, a section at right angles to Figure 4, Figure 6, a detail of the upper strut in Figures 4 and 5, and Figure 7, a detail of a modified strut, In the drawings reference character 10 indicates the head of the piston which is secured to the skirt 11 by means of bolts 12 engaging threaded openings in bosses 13 on the head and fitting loosely in openings through bosses 13′ on the skirt. These bolts also extend through openings in the hollow piston pin 14 which is mounted in bearings on the extensions 13 and is held in fixed position by the bolts.

It will be understood that the lower ends of the bosses 13′ form the piston pin bosses against which the piston pin bears, and the upper parts of the bosses 13′ form necks extending above the piston pin bosses.

The skirt has an annular rim at 15 extending upwardly to surround the lower portion of the head and a disc strut 16, preferably made of a steel stamping, is located between the head and the adjacent part of the skirt, said strut fitting closely within the rim 15 except at the parts nearest to the bolts 12 where the strut is relieved to a slight extent as at 17 to allow for cases where the cylinders go out of round. It will be seen that the strut acts as a rigid member to prevent contraction of the skirt in a direction transversely of the piston pin whereas a slight contraction is permitted longitudinally of the piston pin by the reliefs at 17, 17. The strut 16 has a central aperture adapted to be engaged by a depending hollow boss 18 on the head of the piston. This boss fits closely within the opening and is of assistance in locating the head in alinement with the skirt. The strut is also provided at each side of a line passing through bolts 12 with groups of openings 18′ arranged in semi-circles.

The disc strut 16 is set into the upper ends of the necks extending above the piston pin bosses, and can be said to be embedded in the necks.

Beneath the piston pin is a bracing ring 19 apertured at diametrically opposed points to accommodate the bolts 12 and having an elliptical opening with its major axis transverse to the piston pin. This ring serves to limit the contraction of the lower part of the skirt in the same manner as strut 16 limits the contraction of the upper part and is relieved at 19′ in similar manner to strut 16.

The piston pin is flattened near its ends for secure engagement by the ring 19 and washers 20 are placed between the heads of the bolts and the lower strut, these washers each having an arcuate surface at one side as indicated at 21 to bear against the inner surface of the skirt.

The skirt is slitted at intervals from above and below as shown at 22 and 23, these slits serving a double purpose in that the upper slits provide a means for the excess oil to escape from the lowermost ring groove through the slits to the interior of the piston, while both the upper and the lower slits act to take care of the expansion of the piston. As the temperature of the piston rises the tongues between adjacent grooves spread laterally by a sort of sidewise crawling action of their material to gradually fill the space normally occupied by the slits but because of the limitation imposed on contraction by the upper and lower struts there will be little or no radial expansion while the contraction upon cooling will proceed in the reverse fashion by the gradual narrowing of the tongues but unaffected by any considerable radial movement in the skirt. It should be noted also that the separation of the skirt from the head tends to insulate the skirt from the high temperature of the head, which effect is augmented by the material of the upper strut which should be selected partly for its relative impermeability to heat as well as for thermal expansion properties to limit expansion and contraction of the skirt to the degree desired.

In the form of the invention shown in the figures heretofore described the upper strut has a series of holes at each side of a line passing through the bolts and a relief at each side at 17, the strut being otherwise in the shape of a disk. In the modification of Figures 4 to 6 I have shown the upper strut 24 as having its outer periphery in the form of a complete circle with openings at both sides of a diameter passing through the bolts 25. This leaves a diametrical bridge at 26 for bracing the strut. A bridge 26′ at right angles to bridge 26 is shown in Figure 7 and this will be found preferable in some cases, the whole making a cruciform bridge structure combining the parts 26 and 26′ to provide increased rigidity. The rigid brace formed by the bridge and the parts adjacent thereto is interrupted only by the bolt holes 27 which accommodate the bolts 25 with a slight clearance. For limiting the expansion and contraction of the upper end of the skirt the strut has an annular groove on its underside adapted to engage an annular flange at 28 on the skirt, the tongue 28 produced in forming the groove on the strut engaging a groove in the skirt between the tongue 28 and the outer periphery of the skirt. This is only one expedient for producing a secure engagement of the skirt and the strut and I may use other methods such as will be obvious to those skilled in the art. It will be obvious that this tongue and groove connection between the disc strut and the end of the skirt can also be used in the structure shown in Figure 1.

The head 10′ is secured to the skirt 11′ by the bolts 25 having heads 30 flush with the upper surface of the piston head and having knurled portions 31 with a press fit in the head.

The skirt is cut away at both sides beneath the piston bearing as shown at 33 and has slots 34 extending from the upper end to a point below the lower part of the piston pin, or otherwise expressed, to a point below the mid-length of the skirt. These slots and cut away portions provide space for the sidewise extension of the tongues formed thereby as above described and permit the skirt to be held against radial extension or contraction by means of the upper strut 24 and a lower bracing ring 19′. The ends of the ring fit between raised parts 35 on the downwardly extending tongues of the skirt and the strut may be fastened to the parts 35 either permanently or otherwise as desired.

The bolts 25 fit in the holes in the skirt extensions 36 with a considerable clearance and passages 37 lead to such holes from the exterior of the piston at the upper end of the skirt, for the purpose of leading excess oil to the interior of the piston.

It will be seen that with my invention it is possible to prevent distortion of the piston in a very effective manner since the upper strut is either approximately in the form of a disk or in the form of a braced ring which cannot yield or go out of round, and which by reason of its interlocking engagement with the upper end of the skirt around the entire perimeter of the skirt effectively controls the size of the skirt along all diameters in the plane of the disc strut.

Various modifications of my device and the parts thereof will be obvious to those skilled in the art and therefore I do not limit myself to what is shown in the drawings and described in the specification but only as indicated in the appended claims.

Having thus fully described my said invention, what I claim as new and desire to secure by Letters Patent is:

1. A piston having a head, a skirt separable therefrom, and a strut between the head and the skirt said strut engaging the upper margin of the skirt to limit the expansion and contraction thereof, substantially as set forth.

2. A piston having a head, a skirt separable therefrom and longitudinally slitted at its upper end, and a strut closely engaging the inner surface of the skirt at its upper margin to prevent contraction thereof, substantially as set forth.

3. A piston having a head, a piston pin, a separable skirt having inner extensions forming bearings for the piston pin, bolts connecting the head and the piston pin to the skirt said extensions having openings fitting loosely about the bolts and one or more oil passages leading to said openings from the upper end of the skirt, substantially as set forth.

4. A piston having a head, a skirt separable therefrom, an upwardly extending rim on the skirt, a strut fitting closely within the rim and separating the head and the skirt, and a boss on the head fitting within an opening of the strut to aline the head and the skirt, substantially as set forth.

5. A piston having a head, a skirt separable therefrom having opposed inward extensions, an upwardly extending rim on the skirt, a piston pin, bolts extending upwardly through the piston pin and said extensions on the skirt and engaging threaded openings in the head, and a strut between the head and the skirt fitting closely within the said rim and relieved at opposite sides adjacent said bolts, substantially as set forth.

6. A piston having a head, a skirt separable therefrom having diametrically opposite inward extensions, bolts passing upward through the piston pin and said extensions into the head for securing the parts together said skirt having slits extending respectively from the upper and lower edges past the piston pin, and upper and lower struts to limit the contraction of the skirt, substantially as set forth.

7. A piston having a head, a skirt separable therefrom having diametrically opposite inward extensions, a piston pin, bolts passing upward through the piston pin and said extensions into the head for securing the parts together said skirt having slits extending respectively from the upper and lower edges past the piston pin, and upper and lower struts bearing against the interior surface of the skirt to limit its contraction said lower strut being in the form of a ring resting against flattened end faces on the under side of the piston pin, substantially as set forth.

8. A piston having a head, a separable skirt having slits extending from its upper and lower edges past the midlength of the skirt, a strut at its upper end, and a strut below such midlength fitting closely against the inner periphery of the skirt to prevent radial contraction thereof, substantially as set forth.

9. A piston having a head, a separable skirt, a strut separating the head and the skirt, bolts in a plane passing through the piston pin connecting the head and the skirt said strut being rigid in a direction transverse to the piston pin and being relieved at the sides nearest the piston pin, substantially as set forth.

10. A piston having a head, a skirt separable therefrom having diametrically opposite inward extensions, bolts passing upward through the piston pin and said extensions into the head for securing the parts together said skirt having slits extending respectively from the upper and lower edges past the piston pin, and upper and lower struts to limit the contraction of the skirt, each of said struts being relieved at opposite sides adjacent to said bolts, substantially as set forth.

11. In a piston, a unitary head, a skirt, a unitary piston pin flattened at its lower side, bolts extending through the pin into the head, and means on said bolts engaging the flat side of the pin to secure it in place, substantially as set forth.

12. In a piston, a head, a skirt, a piston pin flattened at its lower side, bolts extending through the pin into the head, a flat-sided annular strut engaging the flat under side of the pin and the inside of the skirt, and means on the bolts engaging the strut to hold it in place, substantially as set forth.

13. In a piston, a head, a separate skirt having bosses at opposite sides with transverse apertures though the skirt, a piston pin in said apertures said skirt being cut away from said apertures to its lower rim to provide piston pin bearings open at the lower side, and bolts extending through the pin and the head to hold the parts together, substantially as set forth.

14. In a piston, a hollow head having bosses at opposite sides, a separate skirt having bosses in line with those on the head and having transverse apertures at their lower ends, a piston pin, and bolts passing through the pin and said bosses to fix the pin in place, substantially as set forth.

15. In a piston, a unitary head, a unitary piston pin flattened at its lower side, an independent skirt having bosses arranged between the piston pin and the head, and bolts extending through the piston pin into threaded engagement with the head, said bolts having heads engaging the flattened lower side of the piston pin, substantially as set forth.

16. A piston having a head, a skirt, a pin boss, and a strut between the head and the pin boss said strut engaging the upper end of the skirt to limit the expansion and contraction thereof, substantially as set forth.

17. A piston having a head, a skirt and a strut of relatively inexpansible material engaging the skirt adjacent the head in a manner to prevent expansion and contraction thereof, substantially as set forth.

18. A piston having a head, a skirt, and a circular strut said strut having its outer periphery in engagement with the upper end of the skirt near the head to prevent contraction thereof, substantially as set forth.

19. A piston having a head, a skirt, and a circular strut said strut having its outer periphery formed for engagement with the upper end of the skirt near the head in a manner to prevent expansion or contraction of said skirt, substantially as set forth.

20. A piston comprising a head, a skirt, and a strut in the form of a braced ring in engagement circumferentially with the skirt to prevent the same from going out of round, substantially as set forth.

21. A piston having a head, a skirt, and a circular strut engaging the skirt adjacent the head said strut holding the skirt positively against contraction and expansion so as to provide a perfect circle with a uniform clearance, substantially as set forth.

22. A piston comprising a head, a boss on the head, a skirt, a rim on the skirt, and a member between the head and skirt and coacting with the boss and rim to center the head and skirt relatively to each other.

23. In a piston, a head, a skirt separate therefrom, a strut between the head and the skirt, the strut being provided with an opening and a central projection on the head fitting the opening in the strut to center the head relatively to the remaining parts, substantially as set forth.

24. In a piston, a head, an independent skirt, a strut separating the head and skirt, and means for centering the same comprising a rim on one of the other parts fitting closely about the circumference of the strut, substantially as set forth.

25. In a piston, a head, an independent skirt, a strut interposed between said head and skirt, and bolts connecting the head and skirt the strut being cut out to accommodate the bolts and being relieved adjacent such cut-out portions, substantially as and for the purpose set forth.

26. In a piston, a head, a skirt, a piston pin, and positive means extending across the skirt and positively interlocked with the skirt above the pin for controlling the diameter of the skirt along diameters perpendicular to each other.

27. A piston comprising a head, a skirt, piston pin bosses, necks extending upwardly from the bosses, and positive control means extending across the skirt above the pin for controlling the diameter of the skirt along diameters perpendicular to each other, the control means being embedded in the said necks.

28. A piston comprising a head, a skirt having pin bosses and cylinder-bearing portions separated from the head, the skirt being formed with openings extending downwardly partway of the skirt and with openings extending upwardly partway of the skirt, a relatively inexpansible strut above the pin bosses and contacting with the cylinder-bearing portions to control the spacing of the cylinder-bearing portions, and a second relatively inexpansible strut below the pin bosses for controlling the spacing of the lower ends of the cylinder-bearing portions.

29. A piston comprising a head, a skirt and a plate separating the head and the skirt, centering means formed on the skirt for coaction with the plate, and centering means formed on the head for coaction with the plate.

30. A piston comprising a head, a skirt having pin bosses and cylinder-bearing portions separated from the head, the skirt being formed with openings extending downwardly partway of the skirt and with openings extending upwardly partway of the skirt, and a relatively inexpansible strut above the pin bosses, the strut being positively interlocked with the cylinder-bearing portions to control expansion and contraction thereof.

31. A piston comprising a head, a skirt separate from the head, the head and skirt being formed of light weight metal, a disc of material having a lower rate of thermal expansion than that of the skirt, said disc separating the head and skirt to permit expansion of the head independently of the skirt, and mean securing the skirt to the head.

32. A piston having a head, a skirt separable therefrom and longitudinally slitted at its upper end, a strut closely engaging an inner surface of the skirt at its upper end to prevent contraction thereof said strut being in the form of a ring with a bridge extending across the same in line with the piston pin, substantially as set forth.

33. A piston having a head, a skirt separable therefrom and longitudinally slitted at its upper end, a strut closely engaging the inner surface of the skirt at its upper end to prevent contraction thereof said strut being in the form of a ring with a bridge extending across the same, substantially as set forth.

34. A piston having a head, a skirt separable therefrom and longitudinally slitted at its upper end, a strut closely engaging the inner surface of the skirt at its upper end to prevent contraction thereof said strut being in the form of a ring with a bridge extending across the same in line with the piston pin, substantially as set forth.

35. A piston having a head, a skirt separable therefrom and longitudinally slitted at its upper end, a strut closely engaging the inner surface of the skirt at its upper end to prevent contraction thereof said strut being in the form of a ring with bracing means in the form of a cruciform bridge, substantially as set forth.

36. A piston having a head, a skirt separable therefrom and longitudinally slitted at its upper end, a strut closely engaging the inner surface of the skirt at its upper end to prevent contraction thereof, said strut being in the form of a ring with a cruciform bridge having one member extending across the ring in line with the piston pin and another at right angles thereto, substantially as set forth.

In witness whereof, I have hereunto set my hand at Detroit, Michigan, this 22nd day of July, A. D. nineteen hundred and twenty-six.

ADOLPH L. NELSON.